(12) United States Patent
Kresse et al.

(10) Patent No.: US 7,386,052 B2
(45) Date of Patent: Jun. 10, 2008

(54) AUTOMATION DEVICE USING FSK MODULATION

(75) Inventors: Heiko Kresse, Obernkirchen (DE); Andreas Stelter, Minden (DE); Ralf Schaeffer, Hille (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 11/518,700

(22) Filed: Sep. 11, 2006

(65) Prior Publication Data

US 2007/0118233 A1 May 24, 2007

(30) Foreign Application Priority Data

Sep. 13, 2005 (DE) ...................... 10 2005 043 478

(51) Int. Cl.
*H04B 14/06* (2006.01)
*H04B 1/16* (2006.01)
*H04L 27/00* (2006.01)
*H04L 27/06* (2006.01)
*H04L 5/12* (2006.01)
*H03D 1/00* (2006.01)
*H04J 15/00* (2006.01)
*H04N 7/26* (2006.01)

(52) U.S. Cl. ...................... 375/245; 375/324; 375/340; 370/215; 341/200; 455/205

(58) Field of Classification Search ................ 375/229, 375/245, 322–324, 327–329, 332, 355, 362, 375/373, 376, 340; 342/130, 194, 134–136, 342/196; 327/3, 156; 329/345, 346; 360/39, 360/51; 370/215; 455/205, 214; 341/200
See application file for complete search history.

(56) References Cited

U.S. PATENT DOCUMENTS

| | | | | |
|---|---|---|---|---|
| 4,773,083 A | * | 9/1988 | Baumbach et al. | 375/328 |
| 5,230,012 A | * | 7/1993 | Schenk | 375/362 |
| 5,260,975 A | * | 11/1993 | Saito | 375/327 |
| 5,341,249 A | * | 8/1994 | Abbott et al. | 360/46 |
| 5,555,531 A | * | 9/1996 | Booth et al. | 367/15 |
| 5,602,879 A | * | 2/1997 | Wada | 375/355 |
| 6,286,020 B1 | * | 9/2001 | Eastty et al. | 708/307 |
| 7,012,561 B2 | * | 3/2006 | Toennesen et al. | 342/70 |
| 7,050,525 B2 | * | 5/2006 | Adachi et al. | 375/376 |

* cited by examiner

*Primary Examiner*—Crystal Barnes-Bullock
(74) *Attorney, Agent, or Firm*—Michael C. Prewitt

(57) ABSTRACT

The invention relates to an automation device, with which a multiplicity of physically distributed functional units communicate with each other by means of a common transmission protocol. The device has a microcontroller (110), which is assigned at least one clock generator (120) and one memory unit (150), and which is connected at least to one data sink (130), which is designed to accept a received data bit-stream.

3 Claims, 2 Drawing Sheets

AUTOMATION DEVICE USING FSK MODULATION

CROSS REFERENCE TO RELATED APPLICATION

This application claims priority from German Application DE 10 2005 043 478.9 filed on Sep. 13, 2005 the contents of which are relied upon and incorporated herein by reference in their entirety, and the benefit of priority under 35 U.S.C. 119 is hereby claimed.

BACKGROUND OF THE INVENTION

The invention relates to an automation device, with which a multiplicity of physically distributed functional units communicate with each other by means of a common transmission protocol. These functional units manifest themselves as field devices or operator units according to their automation function.

For some time now it has been common practice in instrumentation and control engineering to use a two-wire line to supply a field device and to transfer measurements from this field device to a display device and/or to an automation control system, or transfer control values from an automation control system to the field device. Each measurement or control value is converted into a proportional DC current, which is superimposed on the DC supply current, where the DC current representing the measurement or control value can be a multiple of the DC supply current. Thus the supply current consumption of the field device is usually set to approximately 4 mA, and the dynamic range of the measurement or control value is mapped onto currents between 0 and 16 mA, so that the known 4 to 20 mA current loop can be used.

More recent field devices also feature universal properties that are largely adaptable to the given process. For this purpose, an AC transmission path capable of bi-directional operation is provided in parallel with the unidirectional DC transmission path, via which parameterization data are transferred in the direction to the field device and measurements and status data are transferred from the direction of the field device. The parameterization data and the measurements and status data are modulated on an AC voltage, preferably frequency modulated.

In process control engineering, it is common in the field area as it is called, to arrange and link field devices, i.e. measurement, control and display modules, locally according to the specified safety requirements. These field devices have analog and digital interfaces for data transfer between them, where data transfer takes place via the supply lines of the power supply arranged in the control area. Operator units are also provided in the control area, as it is called, for controlling and diagnosing these field devices remotely, where lower safety requirements normally apply.

Data transfer between the operator units in the control area and the field devices is implemented using FSK modulation (Frequency Shift Keying) superimposed on the known 20 mA current loops, where two frequencies, assigned to the binary states "0" and "1", are transferred in frames as analog signals.

The general conditions for the FSK signal and the type of modulation are specified in the "HART Physical Layer Specification Revision 7.1-Final" dated 20 Jun. 1990 (Rosemount Document no. D8900097; Revision B).

ASICs specifically developed to implement the FSK interface according to the HART protocol, such as the HT2012 from the SMAR company, are commercially available and in common use. The disadvantage with these special circuits is the permanently fixed range of functions and the associated lack of flexibility to adapt to changing requirements.

Known modern automation devices are usually equipped with a processing unit known as a microcontroller, which is used to perform the correct data processing for the automation task of the functional unit concerned.

The aim is to reproduce the functions of the FSK interface according to the HART protocol in the controller of the processing unit of the automation devices, without impairing in the process the automation task of the functional unit concerned.

Hence the object of the invention is specifically to define an automation device having means for converting an FSK signal into a data bit-stream using a microcontroller known per se.

SUMMARY OF THE INVENTION

The invention is based on an automation device having a processing unit, which is assigned at least one memory unit for storing instructions and data and which is connected to a communications line. Connected to this processing unit is a data sink which is designed to accept a received data bit stream.

Starting from the communications line, the automation device has a quantization stage which has a delay stage and a mixing stage arranged in parallel downstream of it. The delay stage has a delay time which corresponds to a phase angle of 90° of the carrier frequency of the line signal.

The output of the delay stage is connected to the mixing stage. The mixing stage is in the form of a multiplication stage. In this case, the output signal from the quantization stage forms the first multiplication factor and the output signal from the delay stage forms the second factor. A low-pass filter whose output is connected to the processing unit is connected downstream of the mixing stage. A function of the differential frequency of the line signal and carrier frequency can be tapped off at the output of the low-pass filter.

BRIEF DESCRIPTION OF THE DRAWINGS

The invention is explained in more detail below with reference to an exemplary embodiment. In the drawings required for this, FIG. 1 shows schematically an automation device 100 to the extent necessary to understand the present invention.

DETAILED DESCRIPTION OF ILLUSTRATIVE EMBODIMENTS

Figure 1:
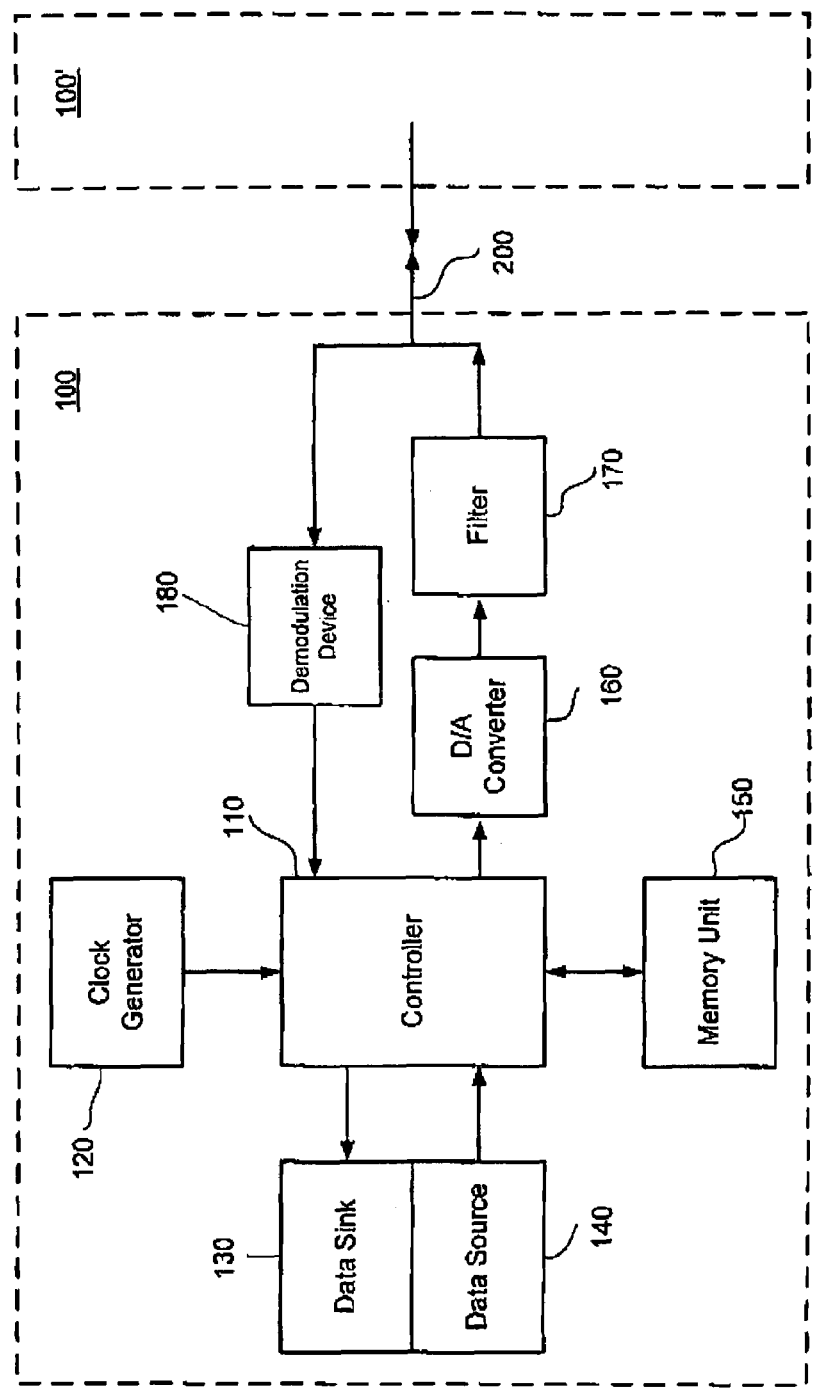
FIG. 1 shows a block diagram of an automation device

The automation device 100 is connected via a communications line 200 to an automation device 100' of substantially the same type. The communications line 200 is used bi-directionally. The information sent by the automation device 100 is received by the automation device 100', and vice versa. Hence reference is only made below to the automation device 100 shown in detail.

A core component of the automation device 100 is a controller 110, which is connected at least to one memory unit 150 and one timing element, referred to below as a clock generator 120 for the sake of simplicity. Usually, however, parts of the clock generator 120 are already implemented in the controller 110.

The controller 110 has connections for connecting a data sink 130 and a data source 140.

A configurable and/or parameterizable sensor for converting a physical variable into an electrical variable can be provided as the data source 140, in which case the configuration and/or parameterization is the data sink 130.

In an alternative embodiment, it can be provided that the data sink 130 is an actuator for converting an electrical variable into a physical variable whose properties can be diagnosed. The diagnostic device provided for this purpose is then the data source 140.

In a further embodiment, it can be provided that the automation device 100 is part of a higher-level device designed for bi-directional communication with additional automation devices 100'. In this embodiment, the higher-level device is both the data source 140 and the data sink 130.

In a further embodiment, the automation device 100 can be designed as a "protocol converter". In this embodiment, the data source 140 and the data sink 130 are formed by a second communications system.

To implement the invention, however, it is sufficient for the data source 140 to be present without the data sink 130.

In addition, connected to the controller 110 is a digital-to-analog converter 160 whose output is connected to a filter 170. The output of the filter 170 is connected to the communications line 200. In addition, the communications line 200 is taken to the input terminals of the controller 110, via which terminals it is provided that the line signal on the communications line 200 is received.

Figure 2:
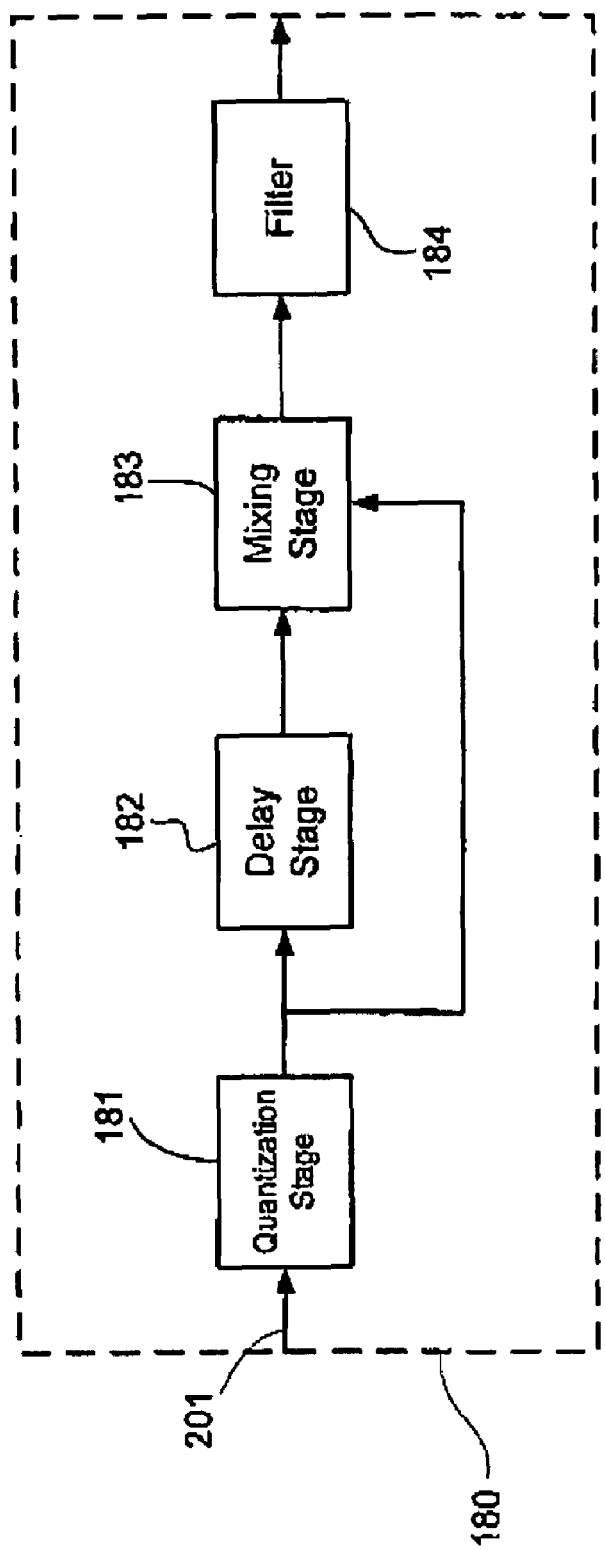
FIG. 2 shows a schematic diagram for converting an FSK signal into a data bit-stream

Starting from the communications line 200, the automation device has a demodulation device 180 at the receive end. A demodulation device 180 is shown schematically in FIG. 2, where the same references are used for the same means.

The demodulation device 180 has a quantization stage 181 which has a delay stage 182 and a mixing stage 183 arranged in parallel downstream of it. The delay stage 182 has a delay time which corresponds to a phase angle of 90° of the carrier frequency of the line signal 201.

The output of the delay stage 182 is connected to the mixing stage 183. The mixing stage 183 is in the form of a multiplication stage. In this case, the output signal from the quantization stage 181 forms the first multiplication factor and the output signal from the delay stage 182 forms the second factor. A low-pass filter 184 whose output is connected to the processing unit 110 is connected downstream of the mixing stage 183. A function of the differential frequency of the line signal 201 and carrier frequency, from which the data bit-stream is reconstructed using the processing unit 110, can be tapped off at the output of the low-pass filter 184.

The invention claimed is:

1. An automation device, with which a multiplicity of physically distributed functional units communicate with each other by means of a common transmission protocol, having a microcontroller, which is assigned at least one clock generator and one memory unit, and which is connected at least to one data sink, which is designed to accept a received data bit-stream, and to which is input a line signal, characterized in that provision is made of a quantization stage (181) which has a delay stage (182) and a mixing stage (183) arranged in parallel downstream of it, the delay stage (182) being connected to the mixing stage (183) and a low-pass filter (184) being connected downstream of the mixing stage (183).

2. The automation device as claimed in claim 1, characterized in that
the mixing stage (183) is a multiplication stage.

3. The automation device as claimed in claim 1, characterized in that
the delay stage (182) has a delay time which corresponds to a phase angle of 90° of the carrier frequency of the line signal (201).

* * * * *